Figure 1:
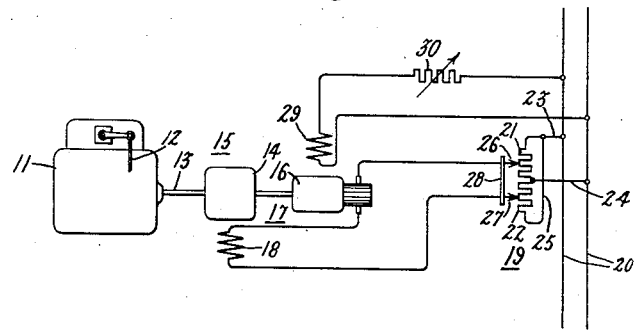

Oct. 6, 1942.     M. A. WHITING     2,298,076
ELECTRIC DYNAMOMETER
Filed July 26, 1940

Inventor:
Max A. Whiting,
by Harry E. Dunham
His Attorney.

Patented Oct. 6, 1942

2,298,076

UNITED STATES PATENT OFFICE 2,298,076

ELECTRIC DYNAMOMETER

Max A. Whiting, Schenectady, N. Y., assignor to General Electric Company, a corporation of New York Application July 26, 1940, Serial No. 347,746

6 Claims. (Cl. 73—51)

This invention relates to electric dynamometers and more particularly to dynamometers of the eddy current brake type for use as absorption devices in loading and measuring the load of prime movers such as internal combustion engines or gearing and other mechanical transmission equipment and the like.

It is an object of my invention to provide an improved dynamometer control system.

It is another object of my invention to provide improved means for stabilizing the operation of an eddy current dynamometer employed for testing prime movers such as internal combustion engines.

It is a further object of my invention to provide means for stabilizing the operation of an eddy current dynamometer employed for testing prime movers and at the same time be able fully to load the prime mover under test at low speeds without the necessity of employing an excessively large and expensive design of the eddy current machine.

Other and further objects and advantages will become apparent as the description proceeds.

In carrying out my invention in its preferred form I provide an auxiliary exciter with its armature connected in series relation with a constant voltage source for supplying the excitation to the field of the eddy current dynamometer which is employed to load the prime mover under test. According to the particular conditions arising in the variety of testing for which the dynamometer may be used, the constant voltage source may be used additively or subtractively with respect to the voltage developed by the exciter. The reasons for this reversible arrangement are explained hereinafter. The exciter is driven by the dynamometer or at a speed proportional thereto so that the exciter furnishes to the dynamometer field a component of excitation proportional to the speed to provide sufficient increase in slope of the torque curve of the dynamometer for stability. In one embodiment of my invention, the auxiliary exciter is separately excited from a constant voltage source, the field of the exciter being connected to the constant voltage source through a variable resistance. The exciter armature and the dynamometer field are connected to the constant voltage source through a reversible potentiometer arrangement. In a modification, the auxiliary exciter is self-excited, its field winding being connected across its armature terminals through a variable resistance. The exciter armature and the dynamometer field are connected in series circuit relation to the constant voltage source through either a variable resistance or a potentiometer as desired. The foregoing arrangements provide convenient means for increasing the slope of the dynamometer torque curve so that it will be greater than that of the engine torque curve at any point to prevent the engine or prime mover being tested from hunting or overspeeding.

Figure 2:
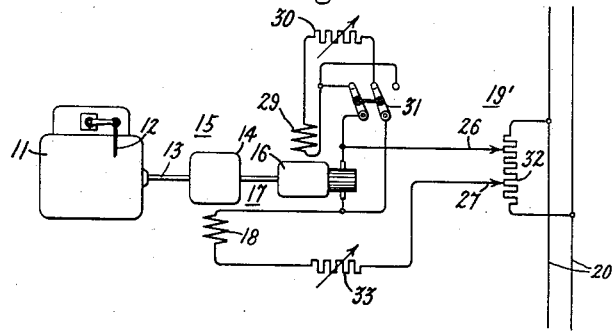
Figure 4:
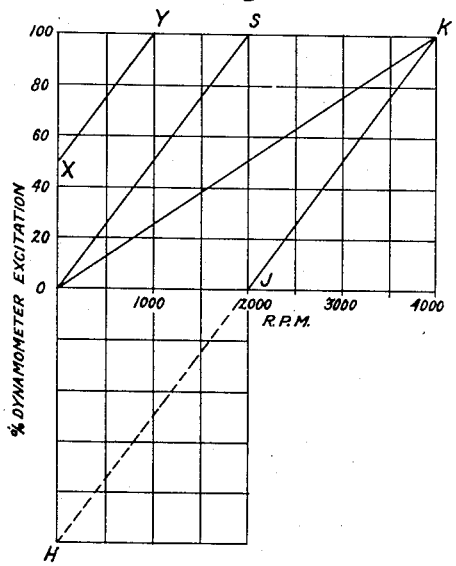
Figure 3:
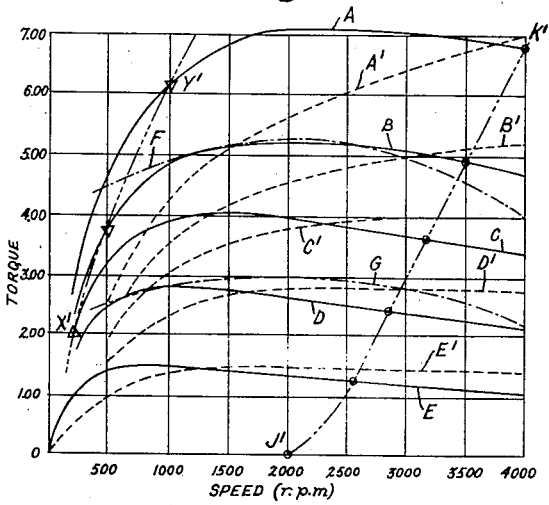

The novel features which are characteristic of my invention are set forth with particularity in the appended claims. My invention, however, both as to its organization and its method of operation will be better understood from reference to the following description when considered in connection with the accompanying drawing in which Figure 1 is a schematic electric circuit diagram of apparatus arranged in accordance with my invention; Fig. 2 is a modification of the arrangement of Figure 1; and Figures 3 and 4 illustrate several characteristic curves which will be employed in explaining my invention.

Referring to the drawing, the numeral 11 represents a prime mover in the form of an internal combustion engine having a throttle 12 but which may be a turbine or an electric motor, and the like. The prime mover is mechanically connected by means of a rotary shaft 13 to the rotor 14 of a dynamometer 15, for example, of the eddy current type. Connected also to the shaft 13 is the rotor or armature 16 of a direct-current dynamoelectric machine 17 which is used as an exciter. The dynamometer 15 is provided with an exciting winding 18 which is adapted to be connected in series circuit relation with the armature circuit of the rotor 16 of the exciter 17, to a control rheostat 19 which is in effect a reversible potentiometer and which is connected to a substantially constant source of direct current supply 20. This potentiometer, which may be embodied in a rotary device if desired, comprises a pair of resistances 21 and 22 connected in opposite directions across the supply leads 20 by means of the connections 23, 24 and 25. A pair of movable contact members 26 and 27 are actuated by a common operating member 28, which in the illustrated arrangement is shown as a longitudinally movable rod for moving the contacts 26 and 27 simultaneously along the resistances 21 and 22 so that the magnitude and polarity of the constant component of voltage impressed upon the field 18 of the dynamometer 15 may be controlled within the desired values. As will be appreciated, if the potentiometer 19 is embodied in a rotary device the operating member 28 will be a rotary shaft and operated by a suitable handwheel as in the case of an ordinary rheostat.

By the term "constant" component of voltage I refer to a component of voltage which is independent of speed variations but which nevertheless may or may not be adjustable in magnitude or reversible in polarity or both.

The exciter 17 is provided with a field winding 29 which is connected to the source of supply 20 through a variable resistance 30 in order that its standard of operation may be changed. The potentiometer 19 being reversible its voltage may be added to or subtracted from the armature voltage of exciter 17. From the foregoing description it will be clear also that the magnitude of the contant component of the dynamometer excitation may be controlled in polarity and magnitude by the movable member 28 and the variable component corresponding to a given speed may be altered by changing the setting of the exciter field rheostat 30.

In Fig. 2, I have shown a similar arrangement in which the exciter 17 is self-excited, its field winding 29 being connected across the terminals of the armature 16 in series circuit relation with an adjustable field rheostat 30 and through a reversing switch 31. The armature 16 is in this case connected in series relation with the dynamometer field winding 18 through a modified form of reversible potentiometer 19' in the form of a single resistance element 32, which is connected across the source 20. As a means of obtaining fine adjustment a vernier rheostat 33 may be inserted in the circuit of the field 18. The reversibility feature is obtained in the potentiometer 19' by making the movable contacts 26 and 27 each independently operable throughout the range of the resistance element 32 so that they may be adjusted relative to each other. By adjusting the exciter field rheostat 30 and the movable contacts 26 and 27 different values of excitation may be provided over a wide speed range and for different torque conditions to vary the ratio of the torque absorption to speed.

As is well understood by those skilled in the art, a self-excited direct-current generator will not build up its voltage without regard to its direction of rotation but for opposite rotation must have its field connected oppositely with respect to its armature. Accordingly, for convenience the reversing switch 31 is preferably inserted in the circuit of the exciter field 29 of Fig. 2.

It will be appreciated that the potentiometer arrangements of Figs. 1 and 2 are alternative arrangements. If the reversibility feature is not required, a simple potentiometer may be employed with but one adjustable contact. If desired, the exciter armature 16 and the dynamometer field 18 in each of the foregoing arrangements may be connected in a simple manner to the source of supply 20 through an adjustable series resistance, and through a reversing switch if reversibility is required; but I prefer the potentiometer arrangements because of the ability to obtain low magnitudes of the fixed component with relatively small resistance control elements and also because of the smoothness with which the constant component may be reversed in polarity. I wish to point out also that the exciter field circuit arrangements of Figs. 1 and 2 may be converted respectively one to the other by a simple switching arrangement, if desired.

As will be understood by those skilled in the art, an eddy current dynamometer such as 15 consists of a suitable eddy current brake, a source of excitation for its field, and a means for measuring the torque exerted upon the dynamometer by the apparatus to be tested. The torque measuring arrangement commonly but not necessarily consists of a cradle mounting of the dynamometer stator and a balanced scale beam which is reacted upon by the cradled stator. Such details are not shown herein since they are well known in the art and form no part of the present invention.

In the testing of prime movers such as internal combustion engines, for example, it is desirable when an eddy current dynamometer is employed for loading the engine to design the eddy current dynamometer to have a high absorption capacity per pound of dead weight, per cubic foot of space occupied, and per dollar of cost, and to have at the same time the suitable characteristics and the flexibility of operation required for utility and convenience of operation.

Let it be assumed that the eddy current braking member of the dynamometer under consideration has a set of speed-torque characteristics essentially like those of the brake referred to but having whatever scale of specific values is suitable to the testing requirements of a typical automobile engine. In the drawing Fig. 3 shows such a set of characteristics.

Curve A shows the torque of the eddy current member 15 plotted against speed when normal maximum excitation of the field winding 18 is held constant. Curve B shows the corresponding characterisic when 75 per cent field is held, and similarly, curves C, D and E show respectively curves for 60, 45 and 30 per cent of maximum excitation. Curve F is a representative speed-torque curve of an internal combustion engine. If we consider the vertical scale of Fig. 3 as in arbitrary torque units and not in pound-feet, curve F represents directly the characteristic of the engine. Assume that an engine having the characteristic of curve F is to be tested by means of the dynamometer whose characteristics are those of A to E, inclusive. Furthermore, assume that the principles of my invention are not employed in connection with the control of the dynamometer excitation, and that control is attempted by means of various preselected constant values of excitation. By selecting various values of excitation between 75 per cent and 100 per cent, the engine load and speed can be held constant at any set of values between a torque of 4.45 at 425 R. P. M. and probably a torque of 4.90 at 1,000 R. P. M. From 1,000 R. P. M. to 1500 R. P. M the brake torque at any one value of excitation in the vicinity of 75 per cent rises a little as the speed increases but only a very little faster than the engine torque Therefore, between 1,000 R. P. M. and 1,500 R P. M., the dynamometer or brake will prevent the engine from running away and will tend to hold it at a constant load and speed. The margin of dominance of the brake torque over the engine torque as the speed is increased from 1,000 to 1,500 R. P. M. is so slight, however, that momentary slight irregularities in fueling, ignition or the like of the engine under test may cause the speed to fluctuate or drift more widely from the mean than is consistent with precise and convenient testing.

In the range including a torque of 5.09 at 1,500 R. P. M. to a torque of 5.25 at 2,000 R. P. M., it happens that the engine torque and the brake torque are almost coincident throughout so that a very slight departure of either value from its normal characteristics will cause the speed to vary widely and the scale beam to become unbalanced. If the speed increases very slightly beyond 2,000 R. P. M., the engine torque establishes a slight but definite preponderance over that of the dynamometer and the speed rises to approximately 2,600 R. P. M. beyond which the engine torque falls off slightly more rapidly than that of the dynamometer. Accordingly the engine will not speed up indefinitely but will run at a speed in the vicinity of 2,600 R. P. M. but subject to a degree of variation. It is obvious that the foregoing represents a thoroughly unsuitable dynamometer characteristic.

Suppose that an attempt were made to test a smaller engine whose throttle characteristic of torque against speed is that of curve G. With a dynamometer excitation of 45 per cent corresponding to the dynamometer characteristic D, the engine under test will run at a torque of 2.60 and at 550 R. P. M. To obtain the next higher speed point in the test, the excitation is decreased slightly to lower the dynamometer characteristic slightly below that of curve D. For so small a change of adjustment, the new characteristic of the dynamometer will be almost parallel to curve D. It is evident then that beyond approximately 650 R. P. M. the engine torque will increase over that of the dynamometer and the engine will race to a speed above 4,000 R. P. M.

Dynamometer characteristics similar to the foregoing are obviously useless except over a narrow range of operation. A partial solution to the problem is to design the eddy current brake so that its maximum torque occurs at a much higher speed.

Let it be assumed, for example, that in a brake whose speed-torque characteristics are those of curves A to E inclusive, a specifically different eddy current member can be substituted whose electrical resistances are, for example, two and one-half times those of the foregoing arrangement but whose magnetic reluctances are substantially unchanged. While such a condition may not be quite attainable in practice, the foregoing assumption will not result in serious error and it will serve to explain the principles with which we are concerned. Such an eddy current brake or dynamometer will have curves of speed against torque as shown in Figure 3 in which the curves corresponding to A to E inclusive are replotted to a speed scale two and one-half times as great. These curves are shown dotted and are indicated by primes such as A' to E' inclusive.

In connection with the new characteristic curves A' to E' inclusive of the eddy current brake, consider again the engine having the full throttle characteristic F. The brake characteristics A', B' and C' and any intermediate characteristics at constant values of excitation each intersect the engine curve F at a substantial angle. At increasing speeds beyond the various intersections the brake torque increases at a greater rate than the engine torque. Hence the operation will be stable and will yield successful test results.

Consider now the engine whose full throttle characteristic is that of curve G. The brake characteristic D' intersects the engine characteristic G at an acute angle but for increasing speeds beyond this point, the brake torque remains substantially constant while the engine torque undergoes a very appreciable decrease. Similarly, if an interpolation is made of various braking characteristics each at a constant field, and each intersecting the engine characteristic G, it will be found that for speeds increasing beyond the speed of intersection there is a slender but appreciable margin of braking torque over engine torque. It is, therefore, possible to test the engine having a characteristic G by means of the dynamometer whose characteristics are those represented by the dotted curves A' to E' inclusive.

It may still be contended that the dynamometer characteristics as shown by the dotted curves are neither very satisfactory nor convenient for testing an engine having the characteristic G. Momentary slight variations in fueling or ignition are to be expected and if the excitation for the eddy current brake is taken from an ordinary supply circuit, the voltage fluctuations caused by other loads going on and off may cause the supposedly constant excitation of the eddy current brake to undergo a slight variation. Since the engine characteristic G and the brake characteristics D' and the like intersect at an acute angle, the speed and the scale balance may be disturbed somewhat more than is desirable in the case of such variations.

If consideration is made of the full throttle run of a still smaller engine having the same shape of characteristic but one-half the torque of G, it will be found that this engine characteristic and the braking characteristic E' coincide over the speed range from 1,500 to 2,500 R. P. M. It is obvious that a successful test could not be made in this range.

Comparing the curves A to E inclusive and the curves A' to E' inclusive, it has been shown that the dynamometer whose eddy current member has the higher resistance is sufficiently stable to be operative over a range within which the dynamometer whose eddy current member having the lower resistance is inoperative. In the attainment of this result, however, dynamometer capacity at low speed has been sacrificed. By the employment of a dynamometer whose characteristics are those of A, B, etc. although the characteristics at intermediate speeds are unstable and useless, the engine whose characteristic follows the curve F can be loaded at speeds from 425 R. P. M. to 1,000 R. P. M or somewhat higher. On the other hand, it has been shown, in connection with the eddy current member whose characteristic curves correspond to A', B', etc., that the use of a high resistance eddy current member introduces the limitation that such a brake cannot fully load the engine having the characteristic F at speeds below 1,600 R. P. M. To obtain at low speeds the stability of the apparatus having the characteristics A', B', etc., in combination with the capacity of the apparatus whose characteristics correspond to A, B, etc., a fundamentally much larger brake must be used if the result is to be obtained merely by the use of a high resistance eddy current member.

The problem which confronts me, therefore, is to provide the desired degree of stability including freedom from drifting of the speed which is substantially better if possible than that obtainable with the apparatus having the characteristics A', B', etc., while at the same time retaining the low speed capacity of the apparatus having the characteristics A, B, etc. and to be able to accomplish this result without the employment of an excessively large and expensive dynamometer or brake element.

As will be clear from reference to Fig. 1, reversing the direction of rotation of the armature 16 of the exciter 17 has the effect of reversing the polarity of the exciter generated voltage. However, by the use of a resersible control element such as the potentiometer 19 of Fig. 1, the same characteristic of excitation may be obtained conveniently for either direction of rotation. A further advantage of the reversible arrangement of the potentiometer 19 or its equivalent lies in the fact that in the same direction of rotation of the exciter 17 the constant component of excitation derived from the source 20 may be made additive to or subtractive from the variable component of excitation furnished by the exciter 17. By using the constant component of excitation so that it is additive or subtractive at will, I thereby make possible the provision of excitation characteristics which are particularly suitable to any selected part of the entire speed range. This is illustrated by the diagram of Fig. 4.

For purposes of illustration, assume that the exciter 17 of Fig. 1 is designed so that, when the rheostat 30 is short circuted or in the "all out" position and the speed is 4000 R. P. M., it will generate a voltage twice that of the constant voltage source 20. Assume now that the potentiometer 19 is adjusted for maximum effect of the source 20 and in opposition to the voltage of exciter 17. The excitation of the dynamometer field 18 will now have the characteristic HJK as shown in Fig. 4, the part HJ below 2000 R. P. M. being useless. Above 2000 R. P. M., however, the dynamometer excitation rises steeply with increasing speeds, along line JK. Consider now the significance of such an excitation system when employed in conjunction with a dynamometer having characteristics as shown in Fig. 3.

In Fig. 4 the dynamometer excitation is 100% at 4000 R. P. M. Curve A of Fig. 3 shows torque plotted against speed at 100% excitation. Therefore, point K of Fig. 4 occurs at 4000 R. P. M. on curve A of Fig. 3, that is, at point K' of Fig. 3. Curve B of Fig. 3 is taken at 75% excitation. In Fig. 4 it will be seen that 75% excitation on curve JK occurs at 3500 R. P. M., that is, at a torque of 4.9 units. Proceeding similarly it will be found that the excitation characteristic JK of Fig. 4 produces the torque characteristic J'K' in Fig. 3. This characteristic and adjoining characteristics obtained by slightly different adjustments of rheostat 30 and potentiometer 19 evidently provide very stable operation within the range in which they lie.

For equally high torques at much lower speeds the characteristic JK is inapplicable. The rheostat 30 may be maintained short-circuited or cut out but the potentiometer 19 may be moved so that the source 20 offers less opposition to exciter 17. Under this condition the excitation characteristic will lie to the left and substantially parallel with line HJK of Fig. 4 The corresponding torque characteristic in Fig. 3 (not shown) will lie to the left of curve J'K' and approximately parallel thereto. When the potentiometer is moved to approximately the mid-position in the opposite direction so that source 20 now aids exciter 17, the excitation characteristic will be approximately as shown by line XY of Fig. 4. This provides a torque characteristic X'Y' in Fig. 3.

If the operating member 28 is now moved to a position such that the arms 26 and 27 rest midway on the respective resistance sections 21 and 22 so that the constant voltage source 20 has no effect, and if rheostat 30 remains ineffective as before, the excitation characteristic will correspond to OS in Fig. 4. If now rheostat 30 is made effective to insert the desired amount of resistance in the exciter field circuit, the characteristic will change from OS to OK. It will thus be clear that by appropriately setting the potentiometer and the exciter field rheostat numerous excitation characteristics may be obtained having various slopes and various points of intersection with the horizontal axis.

In operation, the exciter armature 16 is directly connected to the eddy current dynamometer 15 which is connected to the engine under test 11, and it is assumed that suitable means such as a cradle and scale beam is provided for measuring the torque of the dynamometer. By a proper adjustment of the variable contacts 26 and 27 to provide the desired amount of constant excitation and by manipulating the field rheostat 30 to give the desired variable component of excitation with speed variations, the engine 11 may be loaded at various settings of its throttle 12. The apparatus will operate with stability since any tendency of the engine 11 to increase in speed is accompanied by a corresponding increase in the voltage produced by the exciter 17. This increase in exciter voltage in turn increases the excitation of the dynamometer 15 thereby causing a greater torque absorption. Consequently, for a given setting of the throttle 12 the speed will remain substantially constant.

The arrangement of Fig. 2 operates in substantially the same manner with the exception that, since the exciter 17 supplies its own excitation, if a variation of speed occurs, the exciter voltage varies by a much greater percentage. This is a well-known property of unsaturated self-excited generators. Therefore, the variable portion of the excitation supplied to the eddy current machine 15 varies at a much greater rate than the speed of the engine 11. Thus the desired relation between engine torque and brake torque which is necessary for stable operation and for convenience in testing is provided. As indicated in connection with the description of the operation of Fig. 1, by manipulating the adjustable rheostats 30 and 32, the ratio of the torque absorption to speed may be changed so that the apparatus may be adapted to test the engine 11 at various throttle settings and to test engines of different sizes within the range of the capacity of the dynamometer element 15.

In the arrangement of Fig. 2, if the direction of rotation of the dynamometer must be reversed at times, exciter 17 will not build up as a self-excited machine except by reversing the connections of its field relative to its armature, as already explained. The field switch 31 provides suitable means for reversing these connections.

In the arrangement of Fig. 2 the separate or constant component of excitation derived from source 20 will normally be used in additive relation to the variable component furnished by the exciter 17. At low speeds, at which the torque curves rise steeply at fixed excitations, the major component of the dynamometer excitation may advantageously be derived from the constant voltage source 20, aided by whatever output the exciter is capable of delivering at such low speeds. At high speeds, at which the torque curves at constant excitations are not far from flat—or may even droop with increasing speeds—the constant component of excitation advantageously may be adjusted to a relatively low value, so that most of the excitation of dynamometer field 18 will be provided by the steeply-rising voltage of the self-excited exciter 17.

In the selection or design of exciter 17, its capacity and voltage output with respect to speed and with respect to the voltage of the constant source of supply 20 will depend upon the particular requirements of the specific dynamometer installation. The minimum exciter capacity which will be required for successful operation in carrying out the principles of my invention will not provide as satisfactory operating results as are obtainable by a properly chosen exciter design of more than the minimum capacity. In the arrangement of Fig. 1, if it is desired to produce as great a margin of stability as shown by curves J'K' and JK in Figs. 3 and 4, respectively, the capacity in kilowatts of exciter 17 at maximum speed should be approximately twice the kilowatts consumed in the dynamometer field 18, and the voltage of exciter 17 at that maximum speed should be substantailly twice that of the (opposed) constant voltage source 20 as can readily be deduced from Fig. 4 and the explanation given hereinbefore.

If a less extreme degree of benefit is acceptable, that is a smaller margin of stability, an exciter having a smaller capacity and a lower maximum voltage may be employed. It has been found, for example, as a result of several applications that satisfactory operation may be obtained by the employment of a booster exciter capable of supplying from 20 to 25 per cent of the total maximum dynamometer excitation at normal base speed of the dynamometer, or the speed at which the dynamometer delivers maximum horsepower. This booster exciter, however, furnishes a larger portion of the excitation at higher speeds, the percentage depending upon the speed range of the dynamometer. It is quite possible in certain applications that larger exciters than the foregoing may be required which are capable of supplying 50 per cent or more of the total excitation at base speed where this is necessary for stabilization. It may even be found desirable from a convenience and flexibility standpoint to design the exciter of Fig. 1 of sufficient capacity and voltage so that when rotating at maximum speed it can supply the maximum required excitation without assistance from the source 20.

For the arrangement of Fig. 2, when applied to a dynamometer having characteristics similar to those of Fig. 3, the exciter, when its field rheostat 30 is ineffective, should preferably be capable of beginning its generation as a self-excited machine at a speed corresponding to about 500 R. P. M. in Fig. 3. At its maximum voltage it should preferably be capable of supplying at least 70 per cent of the total requirements, leaving not more than 30 per cent to be supplied by the constant source 20. However, I do not limit my invention in this respect.

There are several advantages to be obtained by the employment of an adjustable constant component of voltage in conjunction with a component which varies with the speed over an arrangement where the exciter furnishes all of the excitation. Such a combination enables the exciter capacity, if desired, to be reduced to an absolute minimum necessary for obtaining proper stability. This permits in many cases the use of an exciter which is sufficiently small that it need not be cradled; that is, it need not be mounted on the cradled member of the dynamometer but instead, it may be mounted directly on the base or pedestal of the dynamometer, which is a distinct advantage from a cost standpoint. This arrangement of parts is made possible in many applications because the power necessary to drive the exciter is a small part of the total power so that the error in measurement or loading may be neglected without objection.

This combination also renders it possible to obtain maximum excitation on the dynamometer at low speeds. In order to obtain all of the available torque from the dynamometer at low speeds it is necessary that the full excitation voltage be available at these low speeds even though it may be only $\frac{1}{20}$ to $\frac{1}{60}$ or less of the normal base speed of the dynamometer. To supply full excitation from an exciter which is mechanically coupled to the dynamometer at these speeds would mean a much greater size and consequently a possibility of extremely high voltages at high speeds. The importance of this feature becomes more readily appreciated when it is realized that these machines may be called upon to operate at speeds ranging from 100 to 6000 R. P. M. Since the torque curve of the dynamometer is inherently rising at these low speeds, as illustrated by the curves of Fig. 3, the stabilizing effect is not necessary in the low speed range. Consequently, the separate excitation source may be drawn upon to obtain maximum torque from the dynamometer at these low speeds without danger of instability, and at the same time an arrangement is provided whereby maximum excitation is obtained on the dynamometer over the entire speed range with a minimum size exciter.

I have thus provided an arrangement which overcomes the difficulties present when eddy current dynamometers are employed for testing prime movers such as internal combustion engines due to the flat or nearly uniform speed-torque characteristics of such dynamometers over a large part of the speed range when the excitation is held at a constant value. It has been shown from the foregoing analysis that a rising torque characteristic with speed is vital for satisfactory operation. The apparatus of my invention provides an automatic load control which increases the torque of the dynamometer with increases in speed thereby rendering the operation stable and preventing hunting and overspeeding.

In accordance with the provisions of the patent statutes, I have described the principle of operation of my invention to represent the best embodiments thereof but I desire to have it understood that the apparatus shown is merely illustrative and that the invention may be carried out by other means.

What I claim as new and desire to secure by Letters Patent of the United States, is:

1. In combination in a testing device, an electric dynamometer including a rotary element and an operating winding for controlling the absorption capacity of said dynamometer, said rotary element being adapted to be driven by a mechanical power producing member to be tested, means comprising a plurality of independent voltage sources adapted to be connected in series relation with each other for supplying current to said winding, one of said voltage sources producing a voltage which varies in accordance with the speed of said dynamometer and the voltage derived from said other source being adjustable in magnitude, whereby the slope of the torque curve of said dynamometer may be modified in accordance with said speed variations to stabilize the operation of said testing device, and single means including a potentiometer in circuit with said winding for selectively connecting said voltage source in additive or subtractive relation and for adjusting said adjustable voltage.

2. In a device for testing a prime mover, an eddy current dynamometer having controllable speed-torque characteristics for loading said prime mover, said dynamometer including a control winding, means for exciting said control winding, said exciting means including a source of electrical power providing an adjustable component of exciting current and a source of electrical power providing a variable component of exciting current which increases automatically with increases in the speed of said prime mover, whereby the torque-absorbing capacity of said dynamometer is increased as the speed increases to stabilize the operation of said testing device, and single means including a potentiometer in circuit with said winding for changing the relative polarities of said different sources of components of exciting current and for adjusting said adjustable component of exciting current.

3. In combination, an electric dynamometer for placing a load of controllable speed-torque characteristics on a mechanical power source, said dynamometer including a rotary element adapted to be connected to said mechanical power source, said dynamometer also including a field winding, an exciter generator driven at a speed proportional to said dynamometer, a field winding for said exciter generator, means for supplying excitation to said exciter field winding, means for reversing the direction of energization of said exciter field winding, means connecting the armature of said exciter for exciting said dynamometer field winding, a substantially constant voltage source of supply, means for deriving adjustable amounts of voltage from said constant voltage source of supply including a potentiometer connecting said adjustable voltage source in circuit with said dynamometer field winding and in series relation with the voltage produced by said exciter for changing the relative polarities of said different sources of voltage and for adjusting the adjustable voltage component, and means for varying the exciting current supplied to said exciter field winding, said exciter being adapted to generate varying amounts of voltage depending on the speed to modify the excitation of said dynamometer in order to change the slope of the dynamometer torque curve to compensate for fluctuations in speed resulting from coincidence in the speed-torque curves of said dynamometer and mechanical power source.

4. In combination in a testing system, an electric dynamometer for placing a load of controllable speed-torque characteristics on a mechanical power source, said dynamometer comprising a rotary element adapted to be connected to said mechanical power source, said dynamometer also including a field winding, an exciter generator driven at a speed proportional to said dynamometer, a field winding for said exciter generator, an adjustable resistance element, said exciter field winding being connected in circuit with said resistance element to the armature of said exciter generator, said resistance element being adapted to change the standard of operation of said exciter, means for reversing the direction of energization of said exciter field winding, a substantially constant voltage source of supply, a potentiometer including a movable element for deriving adjustable values of voltage from said source of supply, and means connecting the armature of said exciter in series circuit relation with said potentiometer including said movable element and said dynamometer field winding for supplying excitation to said dynamometer field winding, the variable component of voltage of said exciter and said adjustable component being related in a manner to modify the slope of the dynamometer torque curve with changes in speed for stabilizing the operation of said testing system.

5. In combination, an electric dynamometer for placing a load of controllable speed-torque characteristics on a mechanical power source, said dynamometer including a field winding and a rotary element adapted to be connected to said mechanical power source, a self-excited generator driven at a speed proportional to said dynamometer, means arranged to control the self-excitation of said generator for changing the standard of operation of said generator, means for reversing the direction of excitation of said self-excited generator, a substantially constant voltage source of supply, means for deriving voltages of either polarity and of adjustable magnitude from said constant voltage source of supply, and means connecting the armature of said generator and said voltage deriving means in series circuit relation with said dynamometer field winding for exciting said dynamometer field winding, whereby varying amounts of voltage depending upon the speed are supplied to said field winding for stabilizing the operation of said dynamometer.

6. In combination in a testing system, an electric dynamometer for placing a load of controllable speed-torque characteristics on a mechanical power source, said dynamometer including a field winding and a rotary element adapted to be connected to said mechanical power source, an exciter generator driven at a speed proportional to said dynamometer, a field exciting winding for said exciter generator, means for connecting said exciter field exciting winding to said exciter generator, means for reversing the direction of energization of said exciter field exciting winding, a substantially constant voltage source of supply, a reversible potentiometer for selectively deriving voltages of either polarity and of adjustable magnitude from said source of supply, and means connecting the armature of said exciter generator in series circuit relation with the voltage derived by said potentiometer and said dynamometer field winding for supplying excitation to said dynamometer field winding, means for varying the excitation of said exciter for adjusting the standard of operation of said exciter, and the voltage components employed for exciting said field winding being related to each other in a manner sufficient to modify the slope of the dynamometer torque curve with changes in speed for stabilizing the operation of said testing system.

MAX A. WHITING.